(12) United States Patent
Cocchi et al.

(10) Patent No.: US 10,952,456 B2
(45) Date of Patent: Mar. 23, 2021

(54) MACHINE AND METHOD FOR PROCESSING LIQUID OR SEMI LIQUID FOOD PRODUCTS

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 174 days.

(21) Appl. No.: 16/253,099

(22) Filed: Jan. 21, 2019

(65) Prior Publication Data

US 2019/0239533 A1 Aug. 8, 2019

(30) Foreign Application Priority Data

Feb. 2, 2018 (IT) .................. 102018000002365

(51) Int. Cl.
*A23G 9/22* (2006.01)
*A23G 9/16* (2006.01)
(Continued)

(52) U.S. Cl.
CPC ............ *A23G 9/228* (2013.01); *A23G 9/16* (2013.01); *A23G 9/28* (2013.01); *F25B 49/027* (2013.01);
(Continued)

(58) Field of Classification Search
CPC ...... F25B 2600/111; F25B 2700/21163; A23G 9/045
See application file for complete search history.

(56) References Cited

U.S. PATENT DOCUMENTS 3,517,524 A * 6/1970 Fiedler .................. A23G 9/045
62/188
6,948,326 B2 * 9/2005 Kim .......................... F24F 1/62
62/181
(Continued)

FOREIGN PATENT DOCUMENTS

EP 2084971 A2 8/2009
EP 2281464 A2 2/2011
(Continued)

OTHER PUBLICATIONS

Italian Search Report dated Aug. 16, 2018 for counterpart Italian Patent Application No. IT 201800002365.

*Primary Examiner* — Christopher R Zerphey
(74) *Attorney, Agent, or Firm* — Shuttleworth & Ingersoll, PLC; Timothy Klima

(57) ABSTRACT

A machine for processing liquid or semi-liquid food products including a containing element for containing the product to be dispensed; a stirrer for stirring the product to be dispensed; a heat exchanger fluid flowing in a circuit in a direction of circulation through an evaporator, a compressor, a condenser and a pressure reducing element; a fan rotating about an axis of rotation to force an air flow towards the condenser; a control unit connected to the fan to control the fan through a speed signal; a temperature sensor, located downstream of the condenser in the circulation direction to detect a condensation temperature and configured to send to the control unit a temperature signal as a function of which the control unit generates the speed signal.

15 Claims, 6 Drawing Sheets

(51) Int. Cl.
*F25B 49/02* (2006.01)
*A23G 9/28* (2006.01)

(52) U.S. Cl.
CPC ............... *F25B 2600/0253* (2013.01); *F25B 2600/111* (2013.01); *F25B 2700/21163* (2013.01)

(56) References Cited

U.S. PATENT DOCUMENTS

| | | | |
|---|---|---|---|
| 9,696,076 B2 * | 7/2017 | Prins | F25B 49/027 |
| 9,945,387 B2 * | 4/2018 | Balistreri | F04D 27/004 |
| 2001/0054293 A1 | 12/2001 | Gustafson et al. | |

FOREIGN PATENT DOCUMENTS

| | | |
|---|---|---|
| WO | 0101052 A1 | 1/2001 |
| WO | 2017177417 A1 | 10/2017 |

\* cited by examiner

MACHINE AND METHOD FOR PROCESSING LIQUID OR SEMI LIQUID FOOD PRODUCTS

This application claims priority to Italian Patent Application 102018000002365 filed Feb. 2, 2018, the entirety of which is incorporated by reference herein.

BACKGROUND OF THE INVENTION

This invention relates to a machine, and a related method, for processing liquid or semi-liquid food products, with speed control feature for regulating the rotation speed of the condenser fan.

The technical field this disclosure pertains to is that of machines for thermally processing liquid or semi-liquid food products, in particular cold or iced products. Such machines comprise a product containing element which holds the product and stirs it with a stirrer. These machines also comprise a refrigeration system integrated in the machine to allow thermally processing the product to be dispensed. More specifically, the refrigeration system comprises an evaporator which is associated with the containing element to extract heat from the product in order to cool it to the required thermal conditions.

The refrigeration system comprises a circuit in which a refrigerant fluid is made to circulate and to flow through a compressor which increases the pressure of the refrigerant fluid, a condenser which extracts heat therefrom by exchanging it with the ambient surroundings, a pressure reducing element which decreases its pressure and, lastly, the evaporator which extracts heat from the product to be dispensed and transfers the heat to the refrigerant fluid.

The cooling capacity of the refrigeration system is, however, influenced by the temperature of the ambient surroundings. In effect, if the external temperature were very high, less heat would be exchanged by the condenser and the result would be refrigerant fluid that is warmer when it enters the evaporator. The cooling power of the system is inversely proportional to the temperature of the refrigerant fluid entering the evaporator. In other words, the warmer the refrigerant fluid entering the evaporator, the smaller the amount of heat removed from the product.

These machines generally comprise a fan, associated with the condenser in order to cool the condenser.

The function of the fan is to keep the heat exchange power of the condenser at a level such as to ensure that the machine functions correctly. In effect, increasing the air flow in the condenser enables air that has already exchanged heat to be replaced with "fresh" air at a lower temperature. This allows keeping a higher mean temperature difference between the refrigerant fluid and the air, thus increasing the exchange efficiency of the condenser.

Machines of this kind, however, have a fan that rotates at a constant speed, which is the speed needed for the machine to work at the maximum ambient temperature at which its operation can be guaranteed.

Thus, with the fan working constantly at high rotation speeds, these machines are very noisy and have high energy consumption.

DISCLOSURE OF THE INVENTION

This disclosure has for an aim to provide a machine for processing liquid and semi-liquid food products to overcome the above mentioned disadvantages of the prior art.

More specifically, the arm of this disclosure is to provide a machine for processing liquid and semi-liquid food products which is capable of functioning efficiently under all ambient conditions.

This arm is fully achieved by the machine of this disclosure, as characterized in the appended claims.

According to one aspect of it, this disclosure provides a machine for processing liquid and semi-liquid food products. In an embodiment, the food products are cold or iced products. In an embodiment, the machine is a machine for pasteurizing the food products. In an embodiment, the machine is a machine for making and dispensing cold or iced, liquid or semi-liquid food products.

In an embodiment, the machine comprises a containing element for holding the product to be dispensed. The containing element is provided with a mouth for dispensing the product to be dispensed.

In an embodiment, the machine comprises a stirrer. The stirrer is located inside the containing element. The stirrer rotates about a stirring axis to stir the product to be dispensed. The stirrer rotates in contact with the containing element so as to prevent the product from encrusting the containing element.

In an embodiment, the machine comprises a refrigeration system. The refrigeration system comprises a circuit. The circuit has a heat exchanger fluid flowing in it. The circuit is configured to cause the heat exchanger fluid to circulate in a circulation direction. In an embodiment, the heat exchanger fluid is a refrigerant fluid. Hereinafter, the heat exchanger fluid will be referred to as "refrigerant fluid" without thereby limiting it to this category of fluids but using this term to refer generally to any fluid capable of carrying a quantity of heat.

The circuit of the refrigeration system (the refrigeration system) includes an evaporator. The evaporator is a component of the refrigeration circuit responsible for drawing heat from the ambient surroundings and transferring it to the refrigerant fluid circulating inside it.

The evaporator is (operatively) associated with the containing element.

In effect, since the containing element contains the product to be thermally processed, the evaporator must remove heat from the product to be processed and is thus functionally coupled to the containing element.

It should be noted that in one embodiment, the term "associated" means that the walls of the evaporator coincide with the containing element. In other embodiments, the evaporator is mounted inside the containing element.

The circuit of the refrigeration system (the refrigeration system) comprises a compressor. The compressor is located downstream of the evaporator in the circulation direction. The compressor is configured to increase the pressure of the refrigerant fluid. In an embodiment, the circuit of the refrigeration system (the refrigeration system) comprises a condenser. The condenser is located downstream of the compressor in the circulation direction. The condenser is configured to release heat to the ambient surroundings in order to cool the refrigerant fluid. The releasing of heat is influenced by the temperature of the ambient surroundings. In an embodiment, the circuit of the refrigeration system (the refrigeration system) comprises a pressure reducing element. The pressure reducing element is located between the condenser and the evaporator. The pressure reducing element includes a constriction configured to reduce the pressure of the fluid flowing through it.

In one embodiment, the machine comprises a fan. The fan rotates about an axis of rotation. That way, it is capable of forcing an air flow towards the condenser of the refrigeration system. The air flow which is forced towards the condenser is proportional to the rotation speed of the fan. This forced ventilation allows a change of the air which is in contact with the walls of the condenser, thus increasing performance in terms of heat exchange between the air and the condenser.

In an embodiment, the machine comprises a control unit. The control unit is connected to the fan to control the fan through a speed signal. The control unit is connected to the stirrer. The control unit is configured to drive the stirrer in rotation. The control unit is connected to the compressor in order to drive it.

The control unit may, however, also be connected to other machine components which need to be controlled by means of drive signals—for example, sensors, actuators or other components known to experts in this field. The drive signals comprise the speed signal.

The control unit may be a unit of distributed type, comprising elements which are interconnected with each other.

The control unit may comprise HW and/or software elements.

The term "drive signal" is used in this disclosure to denote an impulsive or continuous signal sent by the control unit and representing an operating condition of a controlled element.

In other words, the control unit sends to the fan an electrical signal of predetermined duration (impulsive) or continuous and the fan changes its speed of rotation as a function of the parameters of the signal (frequency, width or a combination thereof).

In an embodiment, the machine comprises a temperature sensor. In an embodiment, the temperature sensor may be one of the following: a liquid sensor (liquid heat expansion), a bimetallic strip sensor (operating by heat expansion difference), an RTD (operating by change of resistance relative to change of temperature), a thermistor (operating by change of electrical conductivity relative to change of temperature), a thermocouple (operating by Seebeck effect), an integrated temperature sensor (based on the property of semiconductor couplings—diodes and transistors—of having a voltage or current which is highly dependent on the temperature), or optical pyrometers for contactless measurements. Each of the above mentioned temperature sensors corresponds to a different embodiment to be protected under this disclosure.

In an embodiment, the temperature sensor is located downstream of the condenser in the direction of circulation of the heat exchanger fluid or refrigerant fluid. The temperature sensor is configured to determine a condensation temperature. The condensation temperature is the temperature of the refrigerant fluid at a position downstream of the condenser. We have defined this temperature as "condensation temperature" because the temperature of the refrigerant fluid downstream of the condenser is directly correlated with the temperature at which condensation occurs.

In an embodiment, the temperature sensor is configured to send to the control unit a temperature signal representing the condensation temperature.

The temperature signal may be a continuous or impulsive electrical signal whose parameters represent the condensation temperature.

In an embodiment, the control unit is programmed to process the temperature signal.

In an embodiment, the control unit is configured to generate the speed signal as a function of the temperature signal.

The following is specified. Generally speaking, the drive signals are electrical signals generated by the control unit to control the different components of the machine. In an embodiment, the drive signals are, more generally speaking, generated from control signals.

The control signals may, for example, represent the rotation speed of the stirrer, the drive parameters of the compressor, the cooling temperature of the product to be dispensed or any other parameter useful for the control unit to control the machine in optimum manner.

In an embodiment, the machine comprises a user interface. In an embodiment, the user interface is connected to the control unit to allow a user to enter input signals. In an embodiment, the control signals comprise the input signals. In an embodiment, the control signals comprise the temperature signal.

Generating the speed signal as a function of the temperature signal allows the system to adapt the rotation speed of the fan as a function of the ambient conditions. This feature has the advantage of making the fan rotate at the optimum speed for a particular working state and for a specific external condition, avoiding noise and energy consumption over and above what is strictly necessary.

In an embodiment, the control unit is programmed to regulate the rotation speed of the fan. In an embodiment, the control unit is programmed to regulate the rotation speed of the fan through the speed signal.

In an embodiment, the control unit is programmed to regulate the rotation speed of the fan intermittently through the speed signal.

The term "intermittently" is used to mean a control whereby the rotation speed is varied discontinuously in steps, so that a given temperature interval corresponds to a given rotation speed of the fan which remains constant for the entire temperature interval. The temperatures at which the speed changes are defined by threshold temperatures. The term "threshold temperature" is used to mean a temperature set in the control unit.

In an embodiment, the control unit is programmed to drive the fan at a first rotation speed.

In an embodiment, the control unit is programmed to drive the fan at a first rotation speed through the speed signal.

In an embodiment, the control unit is programmed to drive the fan at the first rotation speed for values of condensation temperature which are lower than a first threshold temperature. In other words, the control unit is programmed to set the fan at a first operating configuration corresponding to the first rotation speed and corresponding to values of condensation temperature which are lower than a first threshold temperature.

In one embodiment, the first rotation speed is greater than zero. In another embodiment, the first rotation speed is equal to zero.

In an embodiment, the control unit is configured to drive the fan at a second rotation speed.

The control unit is configured to drive the fan at a second rotation speed through the speed signal.

In one embodiment, the second rotation speed is higher than the first rotation speed.

The control unit is configured to drive the fan at the second rotation speed for values of condensation temperature which are higher than the first threshold temperature.

In other words, the control unit is programmed to set the fan at a second operating configuration corresponding to the second rotation speed and to values of condensation temperature which are higher than the first threshold temperature.

In an embodiment, the control unit is programmed to drive the fan at the second rotation speed for values of condensation temperature comprised between the first threshold temperature and a second threshold temperature. In other words, the control unit is programmed to set the fan at the second operating configuration corresponding to the second rotation speed and to values of condensation temperature which are comprised between the first threshold temperature and the second threshold temperature.

In an embodiment, the control unit is programmed to drive the fan at a third rotation speed which is higher than the second rotation speed.

The control unit is programmed to drive the fan at the third rotation speed for values of condensation temperature which are higher than the second threshold temperature.

In other words, the control unit is programmed to set the fan to a third operating configuration corresponding to the third rotation speed and to values of condensation temperature which are higher than the second threshold temperature.

The second rotation speed is preferably lower than the third rotation speed.

In an embodiment, the first threshold temperature is preferably lower than the second threshold temperature.

In one embodiment, the temperature sensor is located along the circuit of the refrigeration system, between the condenser and the pressure reducing element.

In another embodiment, the sensor is located at another position in the circuit of the refrigeration system.

In this embodiment, the control unit is programmed to execute a correlation program (software). The correlation program is programmed to determine the condensation temperature from the value of a given temperature at a position other than downstream of the condenser and upstream of the pressure reducing element.

In another embodiment, the control unit is programmed to regulate the rotation speed of the fan steplessly. The control unit is programmed to regulate the rotation speed of the fan steplessly between a minimum rotation speed and a maximum rotation speed. The expression "regulate steplessly" is used to denote a regulating mode carried out by the control unit where each temperature value read by the temperature sensor matches a rotation speed of the fan.

This match is preferably defined by a continuous function.

In this embodiment, the temperature sensor is configured to send the temperature signal in real time. The control unit is configured to process the temperature signal and to generate the respective speed signal.

The speed signal is configured to vary the rotation speed of the fan in real time.

The minimum rotation speed in stepless control mode corresponds, preferably, to the first rotation speed in intermittent control mode. In an embodiment, the maximum rotation speed in stepless control mode corresponds, preferably, to the third rotation speed in intermittent control mode. In an embodiment, the maximum rotation speed in stepless control mode corresponds, preferably, to the second rotation speed in intermittent control mode.

In an embodiment, the control unit, when there is no temperature signal, is programmed to set the third rotation speed.

In an embodiment, the control unit, when there is no temperature signal, is programmed to set the second rotation speed.

In an embodiment, the control unit, when there is no temperature signal, is programmed to set the maximum rotation speed.

The circuit comprises a plurality of ducts configured to contain and cause to circulate the refrigerant (or heat exchanger) fluid along the circuit. Each duct comprises an outside surface. Each duct comprises an inside surface in contact with the refrigerant fluid.

In an embodiment, the temperature sensor is in contact with the outside surface of a duct of the circuit. In an embodiment, the temperature sensor is configured to determine the condensation temperature indirectly.

This solution advantageously allows not making any structural change to the duct, making it possible to not create critical points where loss of refrigerant fluid pressure could occur.

In an embodiment, the temperature sensor is in contact with the refrigerant fluid. In an embodiment, the temperature sensor is configured to determine the condensation temperature directly.

This solution guarantees a higher degree of precision of the measurement.

According to one aspect of it, this disclosure also provides a method for processing liquid or semi-liquid food products (preferably cold or iced products).

Preferably, the method is adapted to be implemented in the machine according to any one of the appended claims.

The method comprises a step of holding the product in a containing element from which it will be dispensed.

The method comprises a step of stirring the product inside the containing element by means of a stirrer.

The method comprises (preferably simultaneously with the step of stirring) a step of cooling the product by means of a refrigeration system. The refrigeration system includes a condenser, a pressure reducing element, a compressor and an evaporator, associated with the containing element. A refrigerant fluid circulates in the refrigeration system in a circulation direction.

In an embodiment, the method comprises a step of forced ventilation. In the step of forced ventilation, an air flow is directed towards the condenser of the refrigeration system by a fan which rotates at a variable rotation speed.

In an embodiment, the method comprises a step of driving the fan by means of a speed signal. The speed signal is sent to the fan by a control unit.

In an embodiment, the method preferably comprises a step of controlling.

In an embodiment, the method comprises a step of measuring a condensation temperature with a temperature sensor.

The temperature sensor measures the condensation temperature at a position downstream of the condenser of the refrigeration system. In other words, the condensation temperature is the temperature of the refrigerant fluid at a position downstream of (at the exit of) the condenser. The term "condensation" associated with the temperature is used because the condensation temperature is directly correlated with the temperature at which the refrigerant fluid condenses.

In an embodiment, the method comprises a step of sending a temperature signal, representing the condensation temperature, from the temperature sensor to the control unit.

In an embodiment, the method comprises a step of generating the speed signal by means of the control unit. In the step of generating the speed signal, the control unit generates the speed signal as a function of the temperature signal.

In an embodiment, the control unit is configured to generate the speed signal as a function of the control signals. The temperature signal is included in the control signals.

In an embodiment, the control unit generates drive signals as a function of the control signals. The drive signals comprise the speed signal.

In an embodiment, the method comprises a step of setting parameters, where a user sets input signals through a user interface connected to the control unit.

The control signals comprise the input signals.

In an embodiment, the drive signals are generated as a function of the input signals.

In an embodiment, the step of driving the fan comprises a step of varying the rotation speed of the fan as a function of the temperature signal.

In the step of varying the rotation speed of the fan, the control unit sends to the fan the speed signal, representing the rotation speed of the fan.

In an embodiment, the method comprises a first step of regulating. In the first step of regulating, the control unit sets the fan to a first operating configuration. In the first step of regulating, the control unit generates the speed signal to set the fan to the first operating configuration. In the first operating configuration, the rotation speed of the fan is set at a first rotation speed and the condensation temperature is lower than a first threshold temperature. In other words, when the condensation temperature is lower than the first threshold temperature, the control unit sets the rotation speed of the fan at the first rotation speed.

In an embodiment, the method comprises a second step of regulating. In the second step of regulating, the control unit sets the fan to a second operating configuration. In the second step of regulating, the control unit generates the speed signal to set the fan to the second operating configuration. In the second operating configuration, the rotation speed of the fan is set at a second rotation speed and the condensation temperature is higher than the first threshold temperature. In other words, when the condensation temperature is higher than the first threshold temperature, the control unit sets the rotation speed of the fan at the second rotation speed.

In an embodiment, in the second operating configuration, the rotation speed of the fan is set at a second rotation speed and the condensation temperature is higher than the first threshold temperature and lower than a second threshold temperature.

In an embodiment, the method comprises a third step of regulating. In the third step of regulating, the control unit sets the fan to a third operating configuration. In the third step of regulating, the control unit generates the speed signal to set the fan to the third operating configuration. In the third operating configuration, the rotation speed of the fan is set at a third rotation speed and the condensation temperature is higher than the second threshold temperature. In other words, when the condensation temperature is higher than the second threshold temperature, the control unit sets the rotation speed of the fan at the third rotation speed.

In one embodiment, in the step of controlling, the temperature sensor measures the condensation temperature at a position downstream of the condenser and upstream of the pressure reducing element. In another embodiment, the temperature sensor measures a temperature at any position in the refrigeration system. In this embodiment, the method comprises a step of correlating in which the control unit uses a relation (specifically a correlation function) to calculate the condensation temperature as a function of the temperature measured by the temperature sensor.

In an embodiment, in the step of driving, the control unit steplessly regulates the rotation speed of the fan. In an embodiment, in the step of driving, the control unit regulates the rotation speed of the fan steplessly between a minimum rotation speed and a maximum rotation speed.

In this embodiment, the temperature sensor sends the temperature signal to the control unit in real time. The control unit processes the temperature signal in real time. The control unit generates a drive signal in real time. The control unit sends the drive signal to the fan to vary the rotation speed thereof in real time. Thus, in this embodiment, each temperature signal corresponds to a respective rotation speed of the fan, calculated using a transfer function, programmed to optimize the efficiency of the condenser and fan assembly. This allows optimizing energy consumption and noise as a function of real ambient conditions.

In an embodiment, the method comprises a step of providing for safety. In an embodiment, in the step of providing for safety, the control unit sets the rotation speed of the fan at the third rotation speed when the temperature sensor stops sending the temperature signal or is not working. In an embodiment, in the step of providing for safety, the control unit sets the rotation speed of the fan at the maximum rotation speed when the temperature sensor stops sending the temperature signal or is not working.

This advantageously enhances system safety, thereby guaranteeing operation at the maximum guaranteed temperature even in the event of malfunctioning of the temperature sensor.

BRIEF DESCRIPTION OF THE DRAWINGS

These and other features will become more apparent from the following detailed description of a preferred embodiment, illustrated by way of non-limiting example in the accompanying drawings, in which.

DESCRIPTION OF THE PREFERRED EMBODIMENTS

Figure 1:
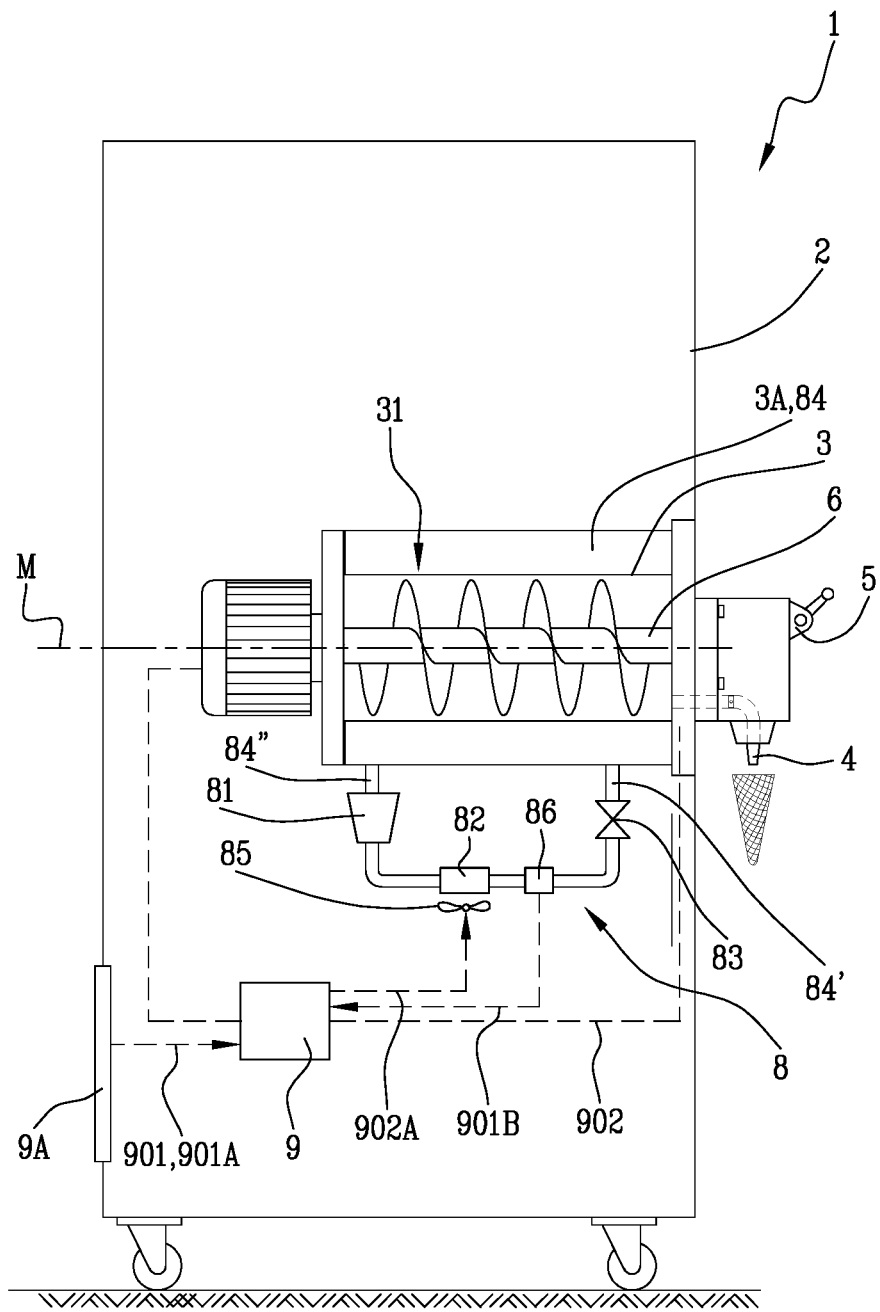
FIG. 1 illustrates an embodiment of a machine for processing liquid or semi-liquid food products.
Figure 2:
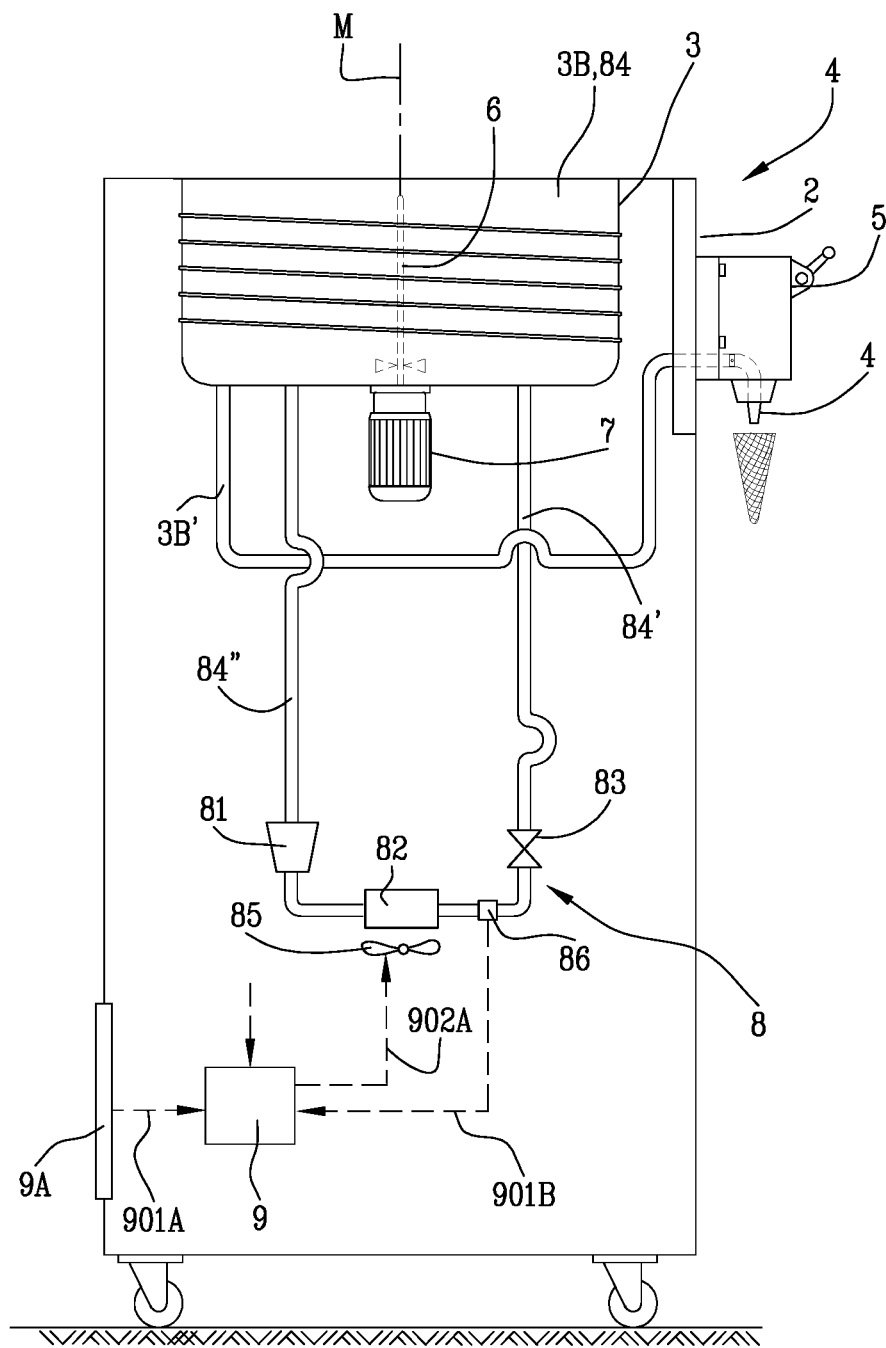
FIG. 2 illustrates another embodiment of a machine for processing liquid or semi-liquid food products.
Figure 3:
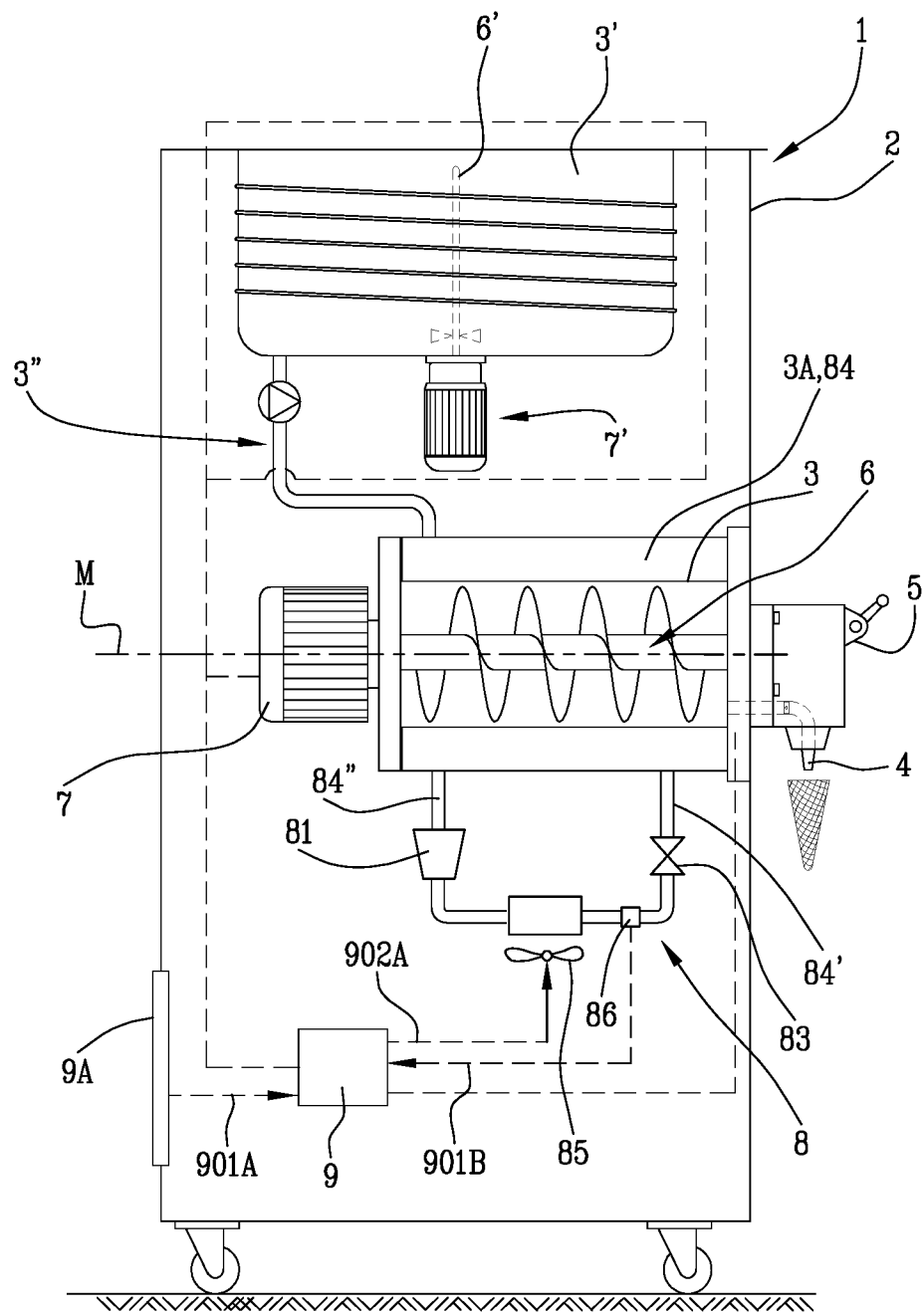
FIG. 3 illustrates another embodiment of a machine for processing liquid or semi-liquid food products.
Figure 4:
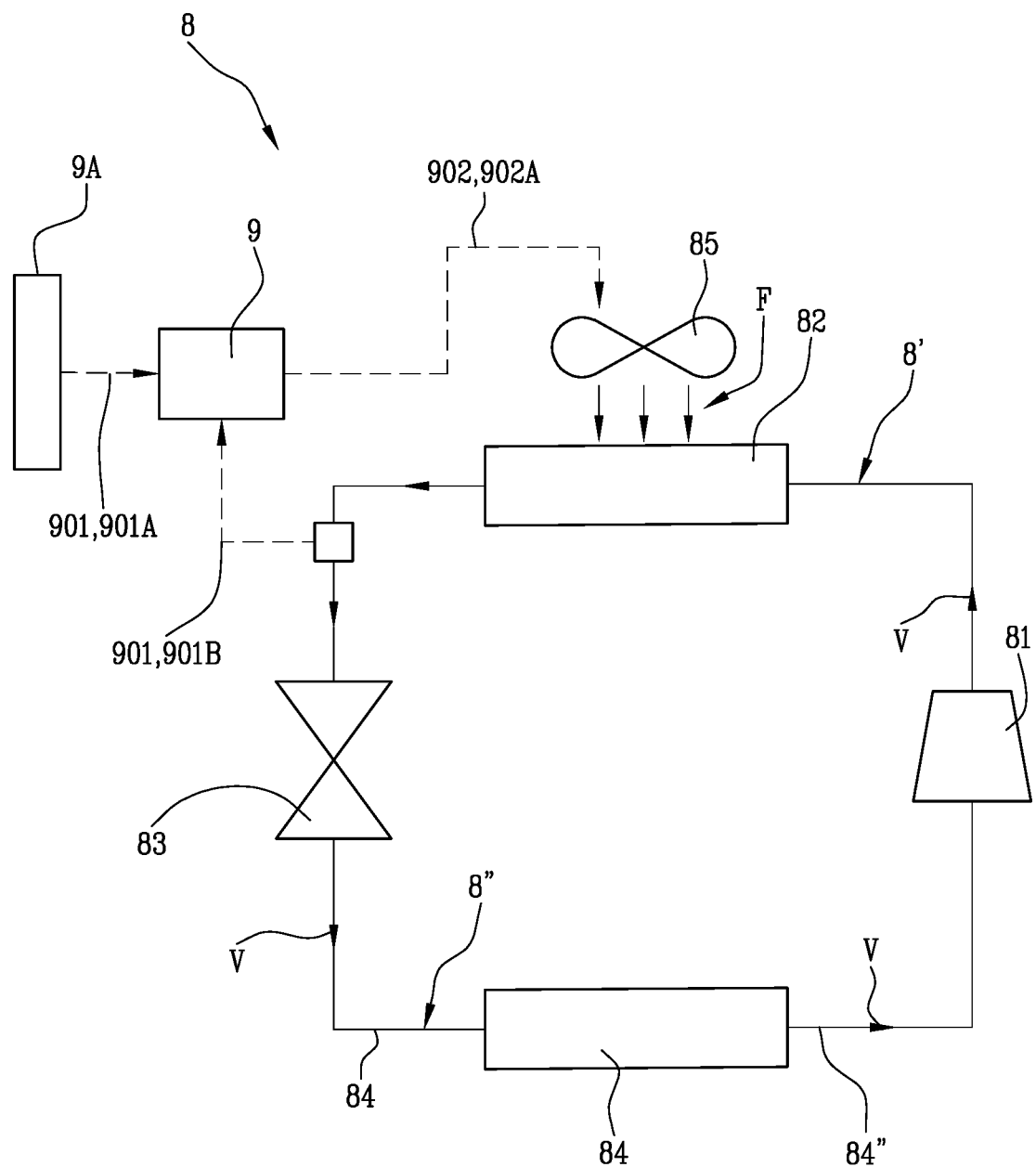
FIG. 4 illustrates a circuit of a refrigeration system of the machine of FIG. 1.
Figure 5A:
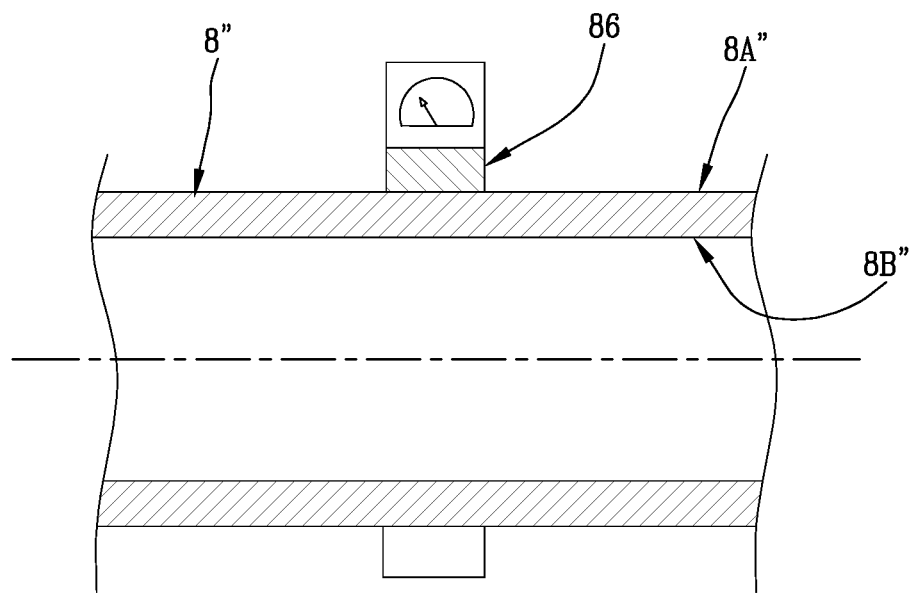
FIGS. 5A and 5B illustrate two embodiments of a temperature sensor of the machine of FIG. 1.
Figure 5B:
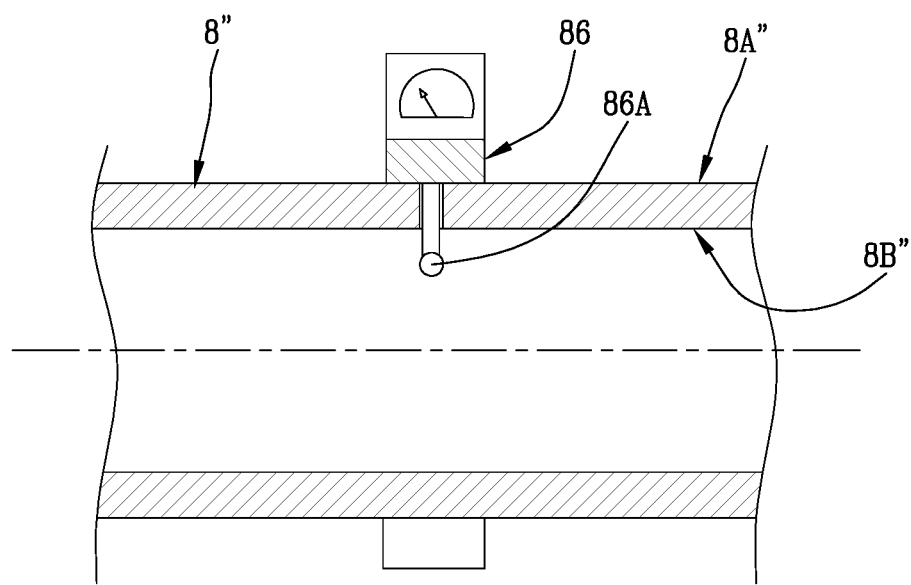

With reference to the accompanying drawings, the numeral 1 denotes a machine for processing liquid or semi-liquid food products. Alternatively, the products may also be cold or iced food products.

The machine 1 comprises a frame 2. In an embodiment, the machine 1 comprises a containing element 3 for holding the product to be dispensed. The containing element 3 is designed to contain the product before the product is dispensed. The machine 1 comprises a dispensing mouth 4. The machine 1 comprises a dispenser 5. The dispensing mouth 4 is connected to the containing element 3. The dispenser 5 is connected to the dispensing mouth 4 to enable or inhibit the flow of fluid through the dispensing mouth 4 itself.

The machine 1 comprises a stirrer 6. The stirrer 6 is mounted inside the containing element 3 to stir the product to be dispensed. In an embodiment, the stirrer 6 is an auger (or endless screw) which rotates about a stirring axis M.

In an embodiment, the machine 1 comprises a first actuator 7. The first actuator 7 is connected to the stirrer 6 to set it in rotation about the stirring axis M. Preferably, the actuator 7 is an electric motor.

In an embodiment, the containing element 3 is a thermal processing cylinder 3A whose axis of symmetry coincides with the stirring axis M.

In an embodiment, the containing element 3 is a thermal processing tank 3B which may have any of several shapes.

In this embodiment, the machine 1 comprises a dispensing duct 3B'. The dispensing duct 3B' is configured to connect the thermal processing tank 3B to the dispensing mouth 4.

In an embodiment, the machine 1 comprises a further containing element 3'. The further containing element 3' is connected to the containing element 3 by a filling duct 3".

In this embodiment, the machine 1 comprises a second actuator 7'. In this embodiment, the machine 1 comprises an auxiliary stirrer 6. The second actuator 7' is connected to the auxiliary stirrer 6 to drive it in rotation and stir the product inside the further containing element 3'.

In this embodiment, the machine 1 preferably also comprises a pump for transferring the product from the further containing element 3' to the containing element 3.

In an embodiment, the machine 1 comprises a refrigeration system 8. The refrigeration system 8 comprises a circuit 8'. The refrigeration system 8 is configured to make a refrigerant fluid inside it flow in a circulation direction V. The circuit 8' comprises a plurality of ducts 8" configured to contain the fluid and to make it circulate in the circuit 8'. Each duct of the plurality of ducts comprises an outside surface 8A" and an inside surface 8B". The circuit 8' comprises a compressor 81. The compressor 81 is configured to increase the pressure of the refrigerant fluid. The circuit 8' comprises a condenser 82. The condenser 82 is configured to remove heat from the refrigerant fluid and to transfer it to the ambient surroundings. The circuit 8' comprises a pressure reducing element such as, for example, a throttle valve 83. The throttle valve 83 is configured to generate load losses in the refrigerant fluid, thereby reducing its pressure. The circuit 8' comprises an evaporator 84. The evaporator 84 is configured to draw heat from the product in order to cool it. The compressor 81, the condenser 82, the throttle valve 83 and the evaporator 84 are located along the circuit 8' in this order in the circulation direction V of the refrigerant fluid. More specifically, the compressor 81 is downstream of the evaporator 84 in the circulation direction V of the refrigerant fluid. The condenser 82 is downstream of the compressor 81 in the circulation direction V. The throttle valve 83 is located between the condenser 82 and the evaporator 84.

In an embodiment, the evaporator 84 coincides with the containing element 3. More specifically, in an embodiment, the thermal processing cylinder 3A coincides with the evaporator 84. In an embodiment, the evaporator 84 and the containing element 3 have a partition wall 31 in common. In particular, the partition wall 31 is in contact with the refrigerant fluid at a first surface of it and with the product to be dispensed at a surface of it opposite to the first surface.

The circuit 8' comprises an inlet duct 84', configured to channel refrigerant fluid into the evaporator 84. The circuit 8' comprises an outlet duct 84", configured to channel refrigerant fluid out of the evaporator 84 towards the compressor 81. The plurality of ducts 8" comprises the inlet duct 84' and the outlet duct 84".

In an embodiment, the circuit 8' comprises a fan 85. The fan 85 is associated with the condenser 82. More specifically, the fan 85 is associated with the condenser 82 to force an air flow towards it. The fan 85 rotates at a rotation speed v. The forced air ventilation produces an air flow F proportional to the rotation speed v. The air flow F is configured to change the air that is in contact with the walls of the condenser 82, thus increasing the quantity of heat released to the ambient surroundings.

In an embodiment, the machine 1 comprises a temperature sensor 86. In an embodiment, the temperature sensor 86 may be one of the following: a liquid sensor (liquid heat expansion), a bimetallic strip sensor (operating by heat expansion difference), an RTD (operating by change of resistance relative to change of temperature), a thermistor (operating by change of electrical conductivity relative to change of temperature), a thermocouple (operating by Seebeck effect), an integrated temperature sensor (based on the property of semiconductor couplings—diodes and transistors—of having a voltage or current which is highly dependent on the temperature), or optical pyrometers for contactless measurements. Each of the above mentioned temperature sensors 86 corresponds to a different embodiment to be protected under this disclosure.

The temperature sensor 86 is configured to measure a condensation temperature Tc. The condensation temperature Tc is the temperature of the refrigerant downstream of (at the outlet of) the condenser 82. The condensation temperature Tc is defined as such because it is directly correlated with the temperature at which the refrigerant fluid condenses (in the condenser 82). In one embodiment, the temperature sensor 86 is configured to determine the condensation temperature Tc at a position downstream of the condenser 82 and upstream of the throttle valve 83. In other embodiments, it could be located at different positions in the circuit 8', provided that the value is suitably processed to determine the condensation temperature Tc.

In an embodiment, the temperature sensor 86 is in direct contact with the refrigerant fluid so as to determine the condensation temperature Tc directly. In an embodiment, the temperature sensor 86 is in contact with the outside surface 8A" of a duct of the plurality of ducts 8" of the circuit 8'. In this embodiment, the temperature of the refrigerant fluid is determined by taking into due account the thermal resistance of the duct according to relations which are known to persons expert in the trade. In this embodiment, the temperature sensor comprises a probe 86A which is in direct contact with the refrigerant fluid.

In an embodiment, the machine 1 comprises a control unit 9. The control unit 9 is preferably connected to one or more of the following parts of the machine 1:

First actuator 7
Second actuator 7'
Stirrer 6
Auxiliary stirrer 6'
Dispenser 5
Circuit 8' of the refrigeration system 8
Compressor 81 of the circuit 8'
Throttle valve 83 of the circuit 8'.

The control unit 9 is programmed to receive control signals 901. The control unit 9 is programmed to process the control signals 901. The control unit 9 is programmed to generate drive signals 902 as a function of the control signals

901. The control unit 9 is programmed to send the drive signals 902 to the parts it is connected to and which it is responsible for controlling.

The machine 1 comprises a user interface 9A. In an embodiment, the user interface 9A is configured to allow a user to send input signals 901A to the control unit 9. The temperature sensor 86 is configured to send a temperature signal 901B to the control unit 9. The temperature signal 901B represents the condensation temperature Tc.

In an embodiment, the control signals 901 comprise the temperature signal 901B. In an embodiment, the control signals 901 comprise the input signals 901A.

In an embodiment, the drive signals 902 comprise a speed signal 902A.

The control unit 9 is configured to process the temperature signal 901B and to generate the speed signal 902A as a function of the temperature signal 901B.

The control unit 9 is programmed to send the drive signals 902 to the fan 85 in order to control the fan. The control unit 9 is programmed to send the speed signal 902A to the fan 85. The control unit 9 is programmed to send the speed signal 902A to the fan 85 in order to control the rotation speed v of the fan.

Described below are some aspects of the programming of the control unit 9 with regard to controlling the rotation speed v of the fan 85 as a function of the condensation temperature Tc. It should be noted that what is described below is provided purely by way of example and is not in any way intended to limit the programming of the control unit.

Figure 6A:
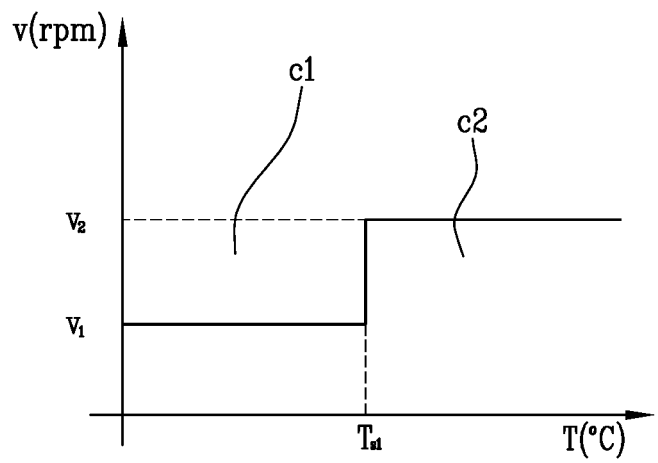
FIGS. 6A, 6B and 6C show, respectively, a first, a second and a third graph representing the modes of regulating a rotation speed of a fan of the machine of FIG. 1.
Figure 6B:
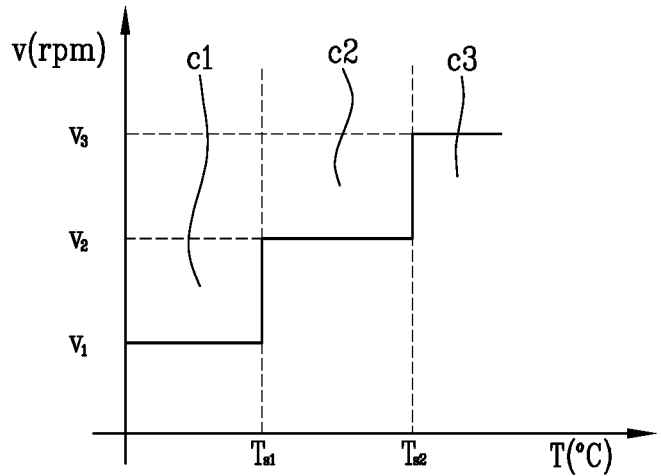
Figure 6C:
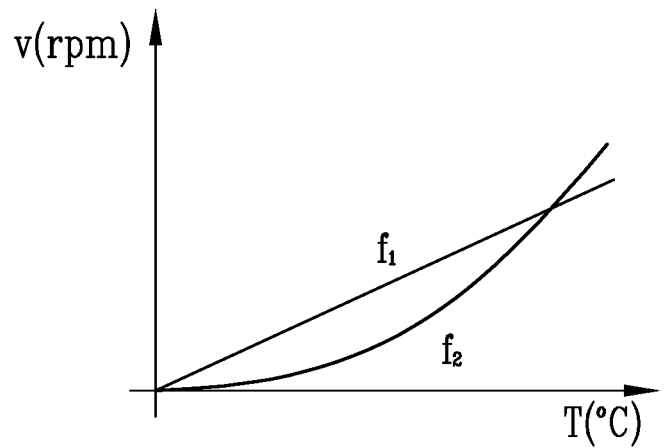

In this regard, it is specified that in the graphs shown in FIGS. 6A, 6B and 6C, the values of the rotation speed v of the fan 85 are shown on the axis of ordinates and the values of the condensation temperature Tc on the axis of abscissas.

In a first embodiment, the control unit 9 is programmed to vary the operating configuration of the fan 85 between a first operating configuration C1 and a second operating configuration C2.

The control unit 9 is configured to set the first operating configuration C1 for values of condensation temperature Tc lower than a first threshold temperature Ts1.

In the first operating configuration C1, the control unit 9 is configured to set the rotation speed v of the fan 85 at a first rotation speed v1.

The control unit 9 is configured to keep the rotation speed v of the fan 85 constant at the value of the first rotation speed v1 for all values of condensation temperature lower than the first threshold temperature Ts1.

The control unit 9 is configured to set the second operating configuration for values of condensation temperature Tc higher than the first threshold temperature Ts1.

In the second operating configuration, the control unit 9 is configured to set the rotation speed v of the fan 85 at a second rotation speed v2.

The control unit 9 is configured to keep the rotation speed v of the fan 85 constant at the value of the second rotation speed v2 for all values of condensation temperature higher than the first threshold temperature Ts1.

In another embodiment, the control unit 9 is programmed to vary the operating configuration of the fan 85 between a first operating configuration C1, the second operating configuration and a third operating configuration C3.

In this embodiment, the control unit 9 is configured to set the second operating configuration for values of condensation temperature Tc higher than the first threshold temperature Ts1 and lower than a second threshold temperature Ts2.

The control unit 9 is configured to keep the rotation speed v of the fan 85 constant at the value of the second rotation speed v2 for all values of condensation temperature higher than the first threshold temperature Ts1 and lower than the second threshold temperature Ts2.

The control unit 9 is configured to set the third operating configuration C3 for values of condensation temperature Tc higher than the second threshold temperature Ts2.

In the third operating configuration C3, the control unit 9 is configured to set the rotation speed v of the fan 85 at a third rotation speed v3.

The control unit 9 is configured to keep the rotation speed v of the fan 85 constant at the value of the third rotation speed v3 for all values of condensation temperature higher than the second threshold temperature Ts2.

In an embodiment, the first rotation speed v1 is lower than the second rotation speed v2. In an embodiment, the second rotation speed v2 is lower than the third rotation speed v3.

In an embodiment, the first threshold temperature Ts1 is preferably lower than the second threshold temperature Ts2.

In a further embodiment to be protected, the control unit 9 is configured to generate speed signals in real time as a function of the temperature signal 901B received in real time. More specifically, for each value of condensation temperature it receives in real time, the control unit 9 generates a speed signal 902A corresponding to an optimum rotation speed v.

In an embodiment, the control unit 9 is configured to vary the rotation speed v of the fan 85 steplessly. The control unit 9 is programmed to vary the rotation speed v of the fan 85 steplessly between a minimum rotation speed vmin and a maximum rotation speed vmax.

In an embodiment, the minimum rotation speed vmin coincides with the first rotation speed v1. In one embodiment, the maximum rotation speed vmax coincides with the second rotation speed v2. In another embodiment, the maximum rotation speed vmax coincides with the third rotation speed v3.

In this embodiment, the control unit 9 is configured to receive the temperature signal 901B, process it with a transfer function and generate the corresponding speed signal 902A. The transfer function is programmed to maximize the efficiency of heat exchange in the condenser 82.

In an embodiment, the transfer function may be a linear function f1. In an embodiment, the transfer function may be an exponential function f2 or polynomial.

In an embodiment, the control unit 9 is configured, when there is no temperature signal 901B, to set the rotation speed v of the fan 85 at the third rotation speed v3.

In an embodiment, the control unit 9 is configured, when there is no temperature signal 901B, to set the rotation speed v of the fan 85 at the maximum rotation speed vmax.

In an embodiment, the control unit 9 is configured to measure the working hours of the machine 1. In an embodiment, the control unit 9 is configured to calculate the working hours of the machine. The control unit 9 is programmed to set the first operating configuration C1 or the second operating configuration C2 as a function of the working hours of the machine 1. More specifically, the control unit 9 is programmed to increase the rotation speed v of the fan 85 with increasing operating hours. That means that in one embodiment, the control unit 9 is configured to determine a first, updated threshold temperature Ts1 determined as a function of the operating hours of the machine 1. The higher the number of operating hours of the machine 1, the lower the first, updated threshold temperature Ts1.

What is set out above with regard to operation with one temperature threshold (first temperature threshold) also applies to operation with two temperature thresholds (first and second temperature thresholds). In effect, the control unit 9 is configured to determine a second, updated threshold temperature Ts2: the higher the number of operating hours, the lower this is than the first threshold temperature Ts1. The same applies to the embodiment with stepless speed variation. In that case, the transfer function is suitably adapted by considering as variable also the operating hours of the machine 1. More specifically, the increase in speed with temperature will be all the higher with the increase in the number of operating hours of the machine 1.

According to one aspect of it, this disclosure is also intended to protect a method for processing liquid or semi-liquid food products.

The method comprises a step of holding, in which the product is held in a containing element 3 from which it will be dispensed.

The method comprises a step of preparing, in which a preparation is made in a further containing element 3' and then transferred into the containing element 3 to be thermally processed.

The method comprises a step of stirring the product inside the containing element 3 by means of a stirrer 6.

The method comprises a step of cooling the product by means of a refrigeration system 8 including a circuit 8' in which a refrigerant fluid circulates in a circulation direction V.

The refrigerant fluid is subjected to one or more of the following steps:

Compressing the refrigerant fluid inside a compressor 81. In this step, the refrigerant fluid may be saturated vapor or superheated vapor.

Condensing the refrigerant fluid inside a condenser 82. In this step, condensation occurs at an effective condensation temperature Tc. The effective condensation temperature Tc is a function of the ambient temperature. In this step, the refrigerant fluid stops condensing and is in the supercooled liquid state, where supercooling is usually constant and not sensitive to ambient temperature changes.

Reducing the pressure of the fluid by means of a throttle valve 83. The pressure of the fluid is reduced by a concentrated load loss represented by the throttle valve 83.

Evaporating the refrigerant fluid. The refrigerant fluid receives heat from the ambient surroundings and evaporates until it once again reaches the state of saturated or superheated vapor entering the compressor 81.

In an embodiment, the step of evaporating the refrigerant fluid coincides with the step of cooling the product to be dispensed. In effect, evaporation of the refrigerant fluid causes heat to be removed from the product.

In an embodiment, the step of cooling comprises a step of forced ventilation. In the step of forced ventilation, a fan 85 produces an air flow F directed towards the condenser 82 of the refrigeration system 8. The step of forced ventilation increases the heat exchange performance of the condenser 82.

In an embodiment, the method comprises a step of driving, in which a control unit 9 drives the fan 85. In the step of driving, the control unit 9 drives one or more of the following parts: the stirrer 6, an auxiliary stirrer 6, a plurality of actuators.

In an embodiment, in the step of driving, the control unit 9 sends drive signals 902.

In an embodiment, the method comprises a step of controlling.

In the step of controlling, the control unit 9 can receive control signals 901 from the components it is connected to. In an embodiment, the control signals 901 comprise input signals 901A. The input signals 901A are entered by a user through a user interface 9A.

In the step of controlling, a temperature sensor 86 measures a condensation temperature Tc. In the step of controlling, the temperature sensor 86 measures the temperature of the refrigerant fluid downstream of the condenser 82. The condensation temperature Tc is the temperature of the refrigerant downstream of the condenser 82. The effective condensation temperature Tc can be calculated from the condensation temperature Tc using suitable mathematical relations. In the step of controlling, the temperature sensor 86 sends a temperature signal 901B to the control unit 9. In an embodiment, the temperature signal 901B is part of the control signals 901. In an embodiment, the control unit 9 processes the control signals 901 and generates drive signals 902 as a function of the control signals 901. More specifically, the control unit 9 processes the temperature signal 901B and generates a speed signal 902A as a function of the temperature signal 901B. The speed signal 902A is part of the drive signals 902. The control unit 9 drives the fan 85 through the drive signals 902. In an embodiment, the control unit 9 controls a rotation speed v of the fan 85 through the speed signal 902A.

Described below are some embodiments by which the control unit 9 regulates (controls or drives) the fan 85 and which differ in the control logic used (control unit programming).

In an embodiment, the method comprises a step of controlling intermittently with the control unit 9. By "controlling intermittently" we mean a control mode where the control unit 9 is configured to vary the operating configurations (rotation speed v of the fan 85) discontinuously, by assigning a given operating configuration for a defined interval of condensation temperature Tc.

In an embodiment, the method comprises a step of controlling with a single threshold. In an embodiment, the method comprises a step of controlling with two thresholds. In another embodiment, the method comprises a step of controlling with a plurality of thresholds.

In a yet further embodiment, the method comprises a first step of regulating. In the first step of regulating, the control unit 9 sets the fan 85 to a first operating configuration C1. The control unit 9 sets the fan 85 to the first operating configuration C1 when the condensation temperature Tc is lower than a first threshold temperature Ts1. When the fan 85 is in the first operating configuration C1, it rotates at a rotation speed v equal to a first rotation speed v1 which remains constant for every temperature value lower than the first threshold temperature Ts1.

In an embodiment, the method comprises a second step of regulating. In the second step of regulating, the control unit 9 sets the fan 85 to a second operating configuration C2. The control unit 9 sets the fan 85 to the second operating configuration when the condensation temperature Tc is higher than the first threshold temperature Ts1. When the fan 85 is in the second operating configuration, it rotates at a rotation speed v equal to a second rotation speed v2, which is higher than the first rotation speed v1 and which remains constant for every temperature value higher than the first threshold temperature Ts1.

In the step of controlling with a single threshold, the control unit 9 changes the operating configuration of the fan only between the first operating configuration C1 and the second operating configuration C2.

In an embodiment, the method comprises a third step of regulating. In the third step of regulating, the control unit 9 sets the fan 85 to a third operating configuration C3. The control unit 9 sets the fan 85 to the third operating configuration C3 when the condensation temperature Tc is higher than a second threshold temperature Ts2. When the fan 85 is in the third operating configuration C3, it rotates at a rotation speed v equal to a third rotation speed v3, which is higher than the second rotation speed v2 and which remains constant for every temperature value higher than the second threshold temperature Ts2.

When the control unit 9 carries out the step of regulating with two thresholds, it sets the fan 85 to the second operating configuration when the condensation temperature Tc is higher than the first threshold temperature Ts1 and lower than the second threshold temperature Ts2.

In the step of controlling with two thresholds, the control unit 9 changes the operating configuration of the fan only between the first operating configuration C1, the second operating configuration C2 and the third operating configuration C3.

What is described above regarding regulation with a single threshold and regulation with two thresholds can be extended to regulation with a plurality of thresholds, with the necessary changes made, which are known to experts in the trade. Generally speaking, we may observe that in the case of control with a plurality of thresholds, where n is the number of thresholds, there are n+1 temperature intervals and n+1 corresponding rotation speeds of the fan.

In an embodiment, the method comprises a step of controlling steplessly with the control unit 9. In the step of controlling steplessly, the control unit 9 varies the rotation speed v of the fan 85 steplessly between a minimum rotation speed vmin (corresponding to the first rotation speed v1 in intermittent control mode) and a maximum rotation speed vmax (corresponding to the second rotation speed v2 or the third rotation speed v3, depending on the embodiment of the intermittent control mode).

By "controlling steplessly" we mean a control mode where the control unit 9 is configured to change the operating configurations (rotation speed v of the fan 85) in a continuously variable manner and to assign a given operating configuration for each value of condensation temperature Tc measured by the temperature sensor 86.

In an embodiment, in the step of controlling, the control unit 9 is configured, when the temperature sensor 86 is not working, to set the rotation speed v of the fan 85 to the second rotation speed v2.

In an embodiment, in the step of controlling, the control unit 9 is configured, when the temperature sensor 86 is not working, to set the rotation speed v of the fan 85 to the third rotation speed v3.

In an embodiment, in the step of controlling, the control unit 9 is configured, when the temperature sensor 86 is not working, to set the rotation speed v of the fan 85 to the maximum rotation speed vmax.

In an embodiment, the control unit 9 measures the working hours of the machine 1. The control unit 9 changes the operating configuration of the fan 85 as a function of the temperature signal 901B and of the working hours of the machine 1. The control unit 9 changes the rotation speed v of the fan 85 as a function of the temperature signal 901B and of the working hours of the machine 1. More specifically, the rotation speed v of the fan increases with increasing operating hours.

What is claimed is:

1. A machine for processing liquid or semi-liquid food products, comprising:
    a container element for containing a product to be dispensed and including a mouth for dispensing the product;
    a stirrer mounted inside the container and rotatable about a stirring axis to stir the product;
    a first actuator, including an electric motor connected to the stirrer to rotate the stirrer about the stirring axis;
    a refrigeration system comprising a circuit configured to cause a heat exchanger fluid to circulate in a circulating direction and including an evaporator operatively connected to the container, a compressor located downstream of the evaporator in the circulation direction, a condenser located downstream of the compressor and a pressure reducing element located between the condenser and the evaporator;
    a fan rotatable about an axis of rotation to force an air flow towards the condenser of the refrigeration system;
    a controller connected to the fan to control the fan through a speed signal and also connected to the first actuator to drive the stirrer in rotation and to the compressor to drive the compressor;
    a temperature sensor, located downstream of the condenser in the circulation direction of the heat exchanger fluid to detect a condensation temperature and configured to send to the controller a temperature signal representing the condensation temperature, and wherein the controller is programmed to generate the speed signal as a function of the temperature signal;
    wherein the controller is configured, upon determination that the temperature sensor is not operating, to set a rotation speed of the fan to a maximum rotation speed.

2. The machine according to claim 1, wherein the controller is programmed to regulate the rotation speed of the fan through the speed signal.

3. The machine according to claim 2, wherein the controller is programmed to drive the fan at a first rotation speed for values of condensation temperature below a first threshold temperature, and at a second rotation speed, greater than the first rotation speed, for values of condensation temperature above the first threshold temperature.

4. The machine according to claim 3, wherein the controller is programmed to drive the fan at the second rotation speed for values of condensation temperature between the first threshold temperature, and a second threshold temperature, and at a third rotation speed, greater than the second rotation speed, for values of condensation temperature above the second threshold temperature.

5. The machine according to claim 1, wherein the controller is programmed to regulate the rotation speed of the fan steplessly between a minimum rotation speed and the maximum rotation speed.

6. The machine according to claim 1, wherein the temperature sensor is located along the circuit of the refrigeration system, between the condenser and the pressure reducing element.

7. The machine according to claim 1, wherein the circuit comprises a duct, configured to contain and cause the heat exchanger fluid to circulate, and wherein the temperature sensor is in contact with an outside surface of the duct of the circuit to determine the condensation temperature indirectly from a temperature of the outside surface of the duct.

8. The machine according to claim 1, wherein the temperature sensor is in direct contact with the heat exchanger fluid to determine the condensation temperature directly.

9. A method for processing liquid or semi-liquid food products, comprising the following steps:
- holding the product in a container from which it will be dispensed;
- stirring the product inside the container with a stirrer;
- cooling the product with a refrigeration system including a condenser, a pressure reducing element, a compressor and an evaporator operatively connected to the container and in which a heat exchange fluid circulates in a circulation direction;
- forcedly ventilating the condenser of the refrigeration system with air by a fan rotating at a variable rotation speed;
- driving the fan through a speed signal sent by a controller,
- detecting a condensation temperature of the heat exchanger fluid at a position downstream of the condenser of the refrigeration system, with a temperature sensor;
- sending to the controller a temperature signal representing the condensation temperature detected by the temperature sensor;
- generating the speed signal as a function of the temperature signal;
- wherein the controller is configured, upon determination that the temperature sensor is not operating, to set a rotation speed of the fan to a maximum rotation speed.

10. The method according to claim 9, wherein the step of driving the fan comprises a step of varying the rotation speed of the fan as a function of the temperature signal.

11. The method according to claim 9, wherein, when the condensation temperature is below a first threshold temperature, the controller generates the speed signal to set the rotation speed of the fan at a first rotation speed, and wherein, when the condensation temperature is greater than a first threshold temperature, the controller generates the speed signal to set the rotation speed of the fan at a second rotation speed, which is greater than the first rotation speed.

12. The method according to claim 11, wherein, when the condensation temperature is between the first threshold temperature, and a second threshold temperature, the controller generates the speed signal to set the rotation speed of the fan at the second rotation speed, and wherein, when the condensation temperature is greater than the second threshold temperature, the controller generates the speed signal to set the rotation speed of the fan at a third rotation speed, which is greater than the second rotation speed.

13. The method according to claim 9, wherein, in the step of detecting, the temperature sensor detects the condensation temperature at a position downstream of the condenser and upstream of the pressure reducing element.

14. The method according to claim 9, wherein, in the step of driving, the controller regulates through the speed signal the rotation speed of the fan steplessly between a minimum rotation speed and a maximum rotation speed.

15. A machine for processing liquid or semi-liquid food products, comprising:
- a container element for containing a product to be dispensed and including a mouth for dispensing the product;
- a stirrer mounted inside the container and rotatable about a stirring axis to stir the product;
- a first actuator, including an electric motor connected to the stirrer to rotate the stirrer about the stirring axis;
- a refrigeration system comprising a circuit configured to cause a heat exchanger fluid to circulate in a circulating direction and including an evaporator operatively connected to the container, a compressor located downstream of the evaporator in the circulation direction, a condenser located downstream of the compressor and a pressure reducing element located between the condenser and the evaporator;
- a fan rotatable about an axis of rotation to force an air flow towards the condenser of the refrigeration system;
- a controller connected to the fan to control the fan through a speed signal and also connected to the first actuator to drive the stirrer in rotation and to the compressor to drive the compressor, wherein the controller is configured to measure working hours of the machine;
- a temperature sensor, located downstream of the condenser in the circulation direction of the heat exchanger fluid to detect a condensation temperature and configured to send to the controller a temperature signal representing the condensation temperature, and wherein the controller is programmed to generate the speed signal as a function of the temperature signal and of the working hours of the machine, wherein a rotation speed of the fan is increased with increased working hours.

* * * * *